(12) United States Patent
Newberg et al.

(10) Patent No.: US 7,732,960 B2
(45) Date of Patent: Jun. 8, 2010

(54) MOTOR HAVING THRUST SYSTEM

(75) Inventors: Barry M. Newberg, Florissant, MO (US); L. Ranney Dohogne, Creve Coeur, MO (US); Philip S. Johnson, Granite City, IL (US); Gary W. Borcherding, Florissant, MO (US); James R. Gore, Paragould, AR (US)

(73) Assignee: Emerson Electric Co., St. Louis, MO (US)

( * ) Notice: Subject to any disclaimer, the term of this patent is extended or adjusted under 35 U.S.C. 154(b) by 688 days.

(21) Appl. No.: 11/467,986

(22) Filed: Aug. 29, 2006

(65) Prior Publication Data

US 2008/0054746 A1 Mar. 6, 2008

(51) Int. Cl.
H02K 5/16 (2006.01)
(52) U.S. Cl. .......................................................... 310/90
(58) Field of Classification Search .................. 310/90, 310/91, 89
See application file for complete search history.

(56) References Cited

U.S. PATENT DOCUMENTS

| | | | |
|---|---|---|---|
| 3,966,278 A | 6/1976 | Lewis | |
| 4,008,928 A | 2/1977 | Abel | |
| 4,081,705 A * | 3/1978 | Johnson | 310/90 |
| 4,090,749 A | 5/1978 | Daniels | |
| 4,295,268 A | 10/1981 | Punshon et al. | |
| 4,309,062 A | 1/1982 | Bischoff | |
| 4,533,260 A | 8/1985 | Andrieux | |
| 4,689,507 A * | 8/1987 | Baker et al. | 310/62 |
| 5,075,585 A * | 12/1991 | Teruyama et al. | 310/89 |
| 5,277,500 A | 1/1994 | Keck | |
| 5,677,584 A | 10/1997 | Keck | |
| 5,913,548 A * | 6/1999 | Keck | 29/596 |
| 6,247,223 B1 | 6/2001 | Keck | |
| 6,359,363 B1 | 3/2002 | Foerstera et al. | |
| 6,507,135 B1 * | 1/2003 | Winkler | 310/91 |
| 7,040,453 B2 | 5/2006 | Borcherding | |
| 2005/0264116 A1 | 12/2005 | Borcherding et al. | |

* cited by examiner

Primary Examiner—Nguyen N Hanh
(74) Attorney, Agent, or Firm—Senniger Powers LLP

(57) ABSTRACT

An electric motor includes a stator, a rotor including a rotor shaft having a locating groove formed therein, a thrust system mounted on the rotor shaft, and a locator disposed in the groove for locating the thrust system in a predetermined position.

21 Claims, 7 Drawing Sheets

MOTOR HAVING THRUST SYSTEM

FIELD OF THE INVENTION

The present invention is related to motors having thrust systems.

BACKGROUND OF THE INVENTION

Prior art motors having thrust systems are often assembled using epoxy. While such motors are satisfactory, there are several disadvantages to such motors. First, epoxy application does not lend itself to "lean" manufacturing techniques. The epoxy requires several hours to cure, effectively adding those several hours to the assembly process and increasing the number of motors "in process" at any given time. The epoxy tends to have sharp edges after curing, making it more difficult to handle. Accordingly, a reliable, efficient motor construction that can eliminate the need for epoxy in the manufacturing process is needed.

SUMMARY OF THE INVENTION

In one aspect, an electric motor comprises a stator, a rotor including a rotor shaft having a locating groove formed therein, a thrust system mounted on the rotor shaft, and a locator disposed in the groove for locating the thrust system in a predetermined position.

In another aspect, the electric motor comprises a thrust system mounted on the rotor shaft and including a bearing, a thrust collar and a compressible ring. The thrust collar includes a void for receiving the ring. The void is sized and shaped so that the ring extends axially from a surface of the thrust collar in a relaxed position and does not extend axially from the surface in a compressed position.

In still another aspect, the rotor includes a rotor shaft having a locator and a protrusion spaced therefrom. The thrust system is mounted on the rotor shaft generally between the locator and the protrusion, and the thrust system includes a component having a deformable portion. The deformable portion receives the protrusion and has a depth corresponding to variance in the thrust system so that the thrust system is precisely located relative to the locator regardless of the variance.

Various refinements exist of the features noted in relation to the above-mentioned aspects of the present invention. Further features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

BRIEF DESCRIPTION OF THE DRAWINGS

Corresponding reference characters indicate corresponding parts throughout the drawings.

DETAILED DESCRIPTION OF THE DRAWINGS

Figure 1:
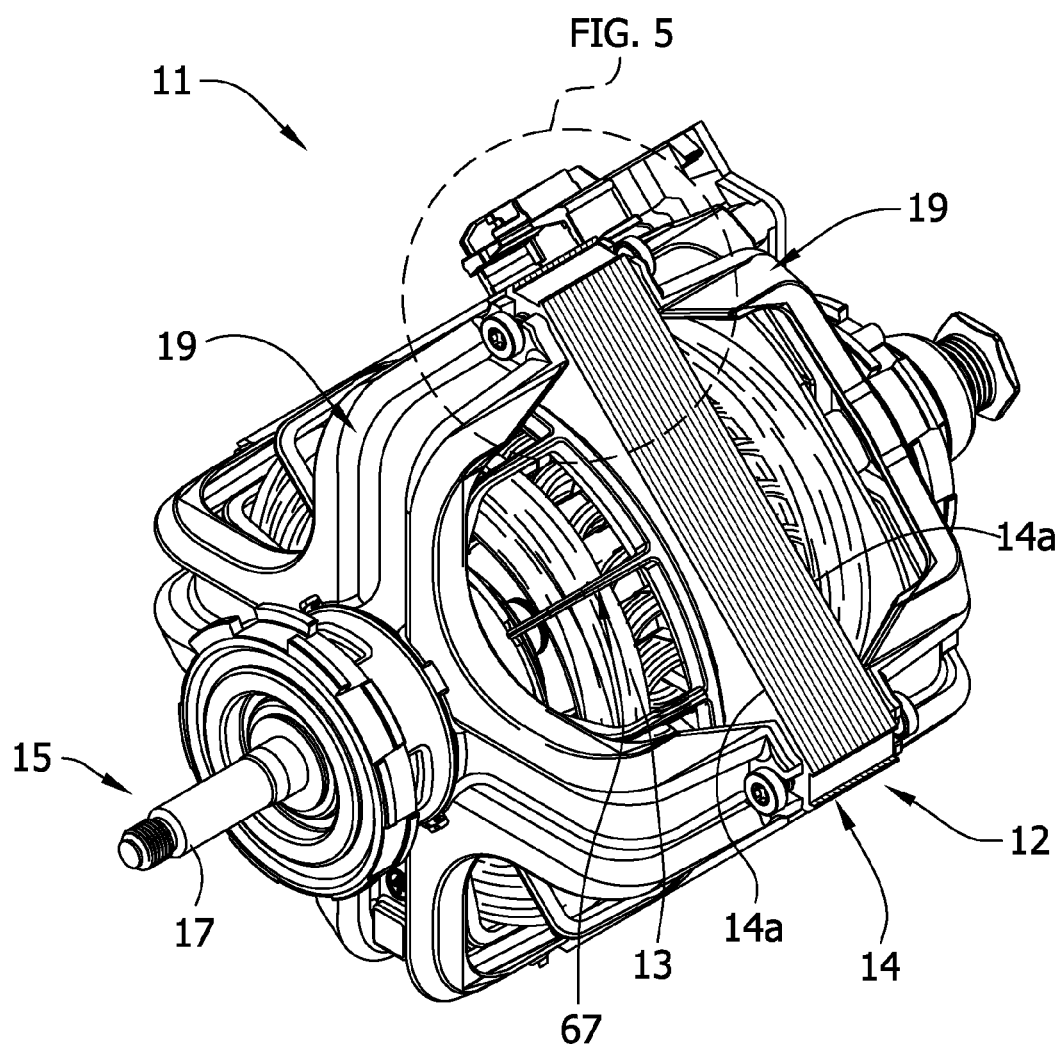
FIG. 1 is a perspective of a motor of one embodiment.
Figure 2:
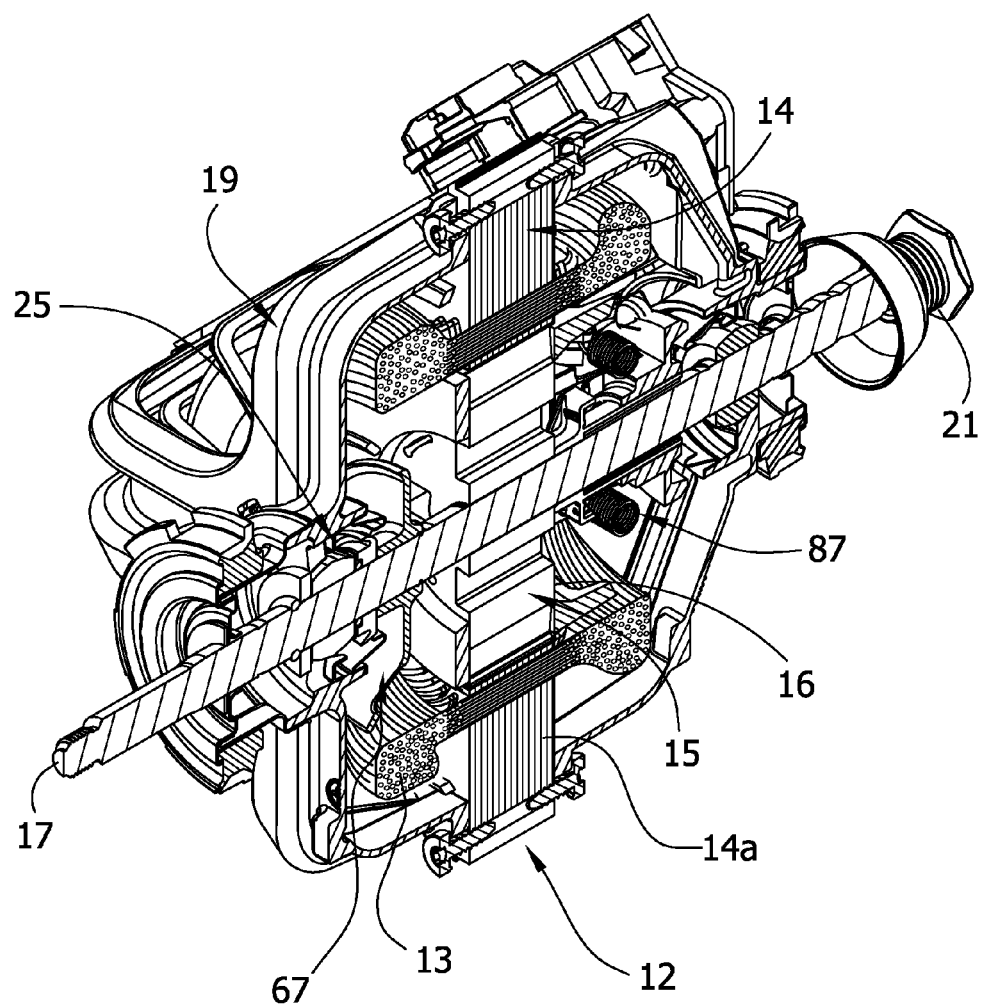
FIG. 2 is a section view of the motor.

Referring to FIGS. 1-2, a motor of one embodiment of the invention is generally designated 11. The motor generally includes a stator 12 having windings 13 and a stator core (generally designated 14) including laminations 14a. A rotor generally designated 15 is in magnetic coupling relation with the stator and has a rotor core 16 and a rotor shaft 17. The motor also includes endshields 19 secured to the stator core 14. The motor 11 may suitably be used as a dryer motor. In a dryer application, one end of the shaft has a grooved pulley 21 for mounting a belt (not shown) thereon for turning the dryer drum. Many other applications for the motor are contemplated within the scope of the invention.

Figure 3:
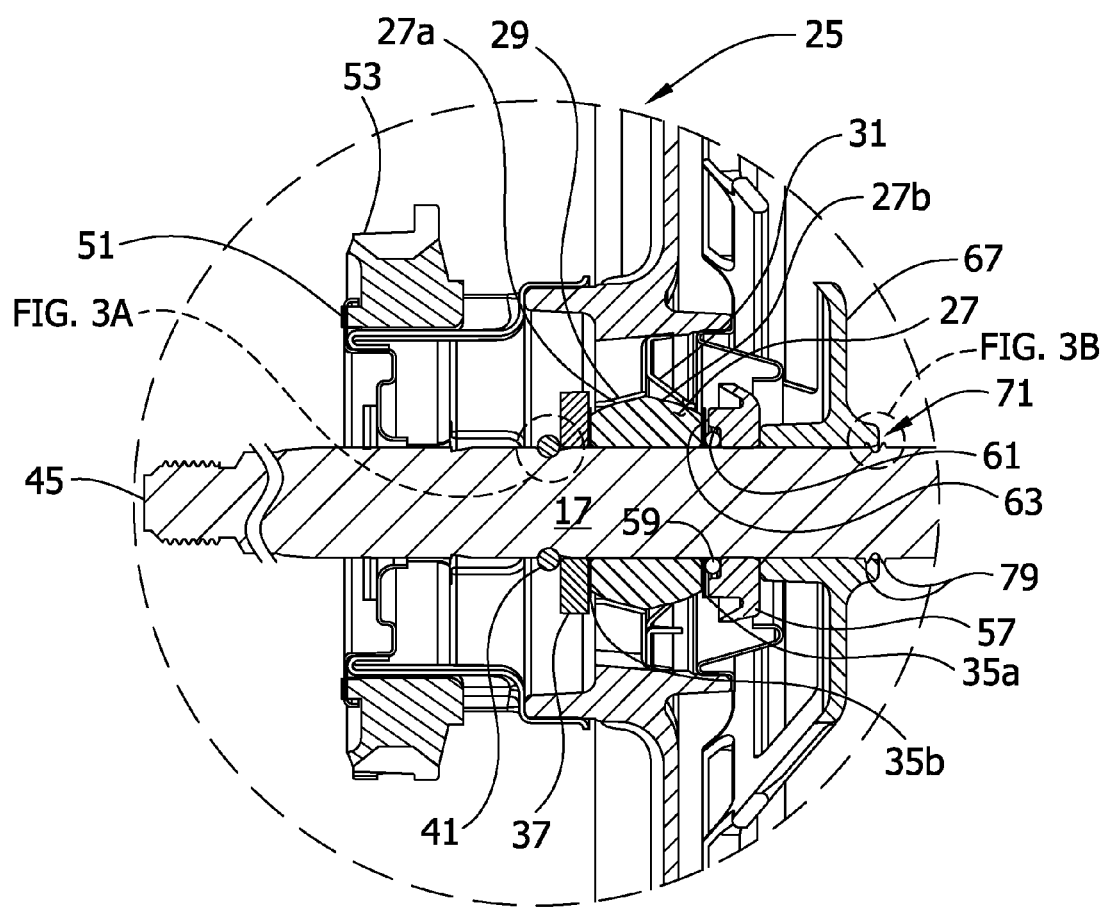
FIG. 3 is an enlarged view of a portion of FIG. 2 and showing the thrust system of this embodiment.

Referring to FIGS. 2-3, a first thrust system 25 is mounted on the rotor shaft 17. The thrust system 25 includes a sleeve bearing 27 mounted in one of the endshields 19 and received over the rotor shaft 17. The endshield 19 includes ribs 29 (sometimes referred to as "a bearing land") contacting an outward circumferential surface 27a of the bearing, and arms 31 of a retainer contacting the opposite inward surface 27b so that the bearing is captured between the ribs and the arms. The ribs 29 and arms 31 together retain the bearing 27 in the endshield 19. Note that terms such as "inward" and "outward" may be used herein for ease of description of the drawings, but such relative terms do not limit the scope of the invention. The endshield 19 is suitably a metal casting, e.g., aluminum, but might also be molded plastic, among other options. The retainer is optionally made separately from the casting.

Inward and outward washers 35a,b of the thrust system 25 are disposed on opposite sides of the bearing 27. In this embodiment, the washers are thin steel washers, e.g., of hardened steel.

A spacer 37 is disposed outward from the outward washer 35b. In this embodiment, the spacer is made of nylon and is about 0.125 inches thick. The inside diameter is sized to slide over the shaft 17, and the outside diameter is sized larger than the outward washer 35b so that in case of inward movement of the bearing relative to the shaft, such as by an impact or other inwardly directed force on the shaft, an inward face of the spacer will bear against the ribs 29 of the endshield and thereby "react out" or transfer the force through the endshield 19, rather than the bearing 27.

An outward o-ring 41 (broadly, a locator or ring) is disposed outward from the spacer 37. This o-ring 41 is received in a locating groove 43 (FIG. 3A) that is integrally formed into the shaft 17. The o-ring is suitably made of a resilient material such as rubber or the like. The inner diameter of the O-ring is sized significantly smaller than that of the full diameter shaft so that it is received in the groove 43. The o-ring may have other than a circular cross-section.

Referring to FIG. 3, the groove 43 of this embodiment is formed in the shaft a precise distance from an outward end 45 of the shaft 17. In turn, the thrust system 25 is precisely located relative to the groove (and the o-ring therein), as further described below. Alternatively, the groove 43 may be formed in the shaft without regard to the distance to the end of the shaft 17, and the thrust system simply may be precisely located relative to the groove, rather than to both the groove and the end of the shaft. In contrast, the end of the shaft may also serve as the locator. Moreover, the locator may have other configurations and may include other features in addition to or instead of the o-ring or end of the shaft.

Figure 3A:
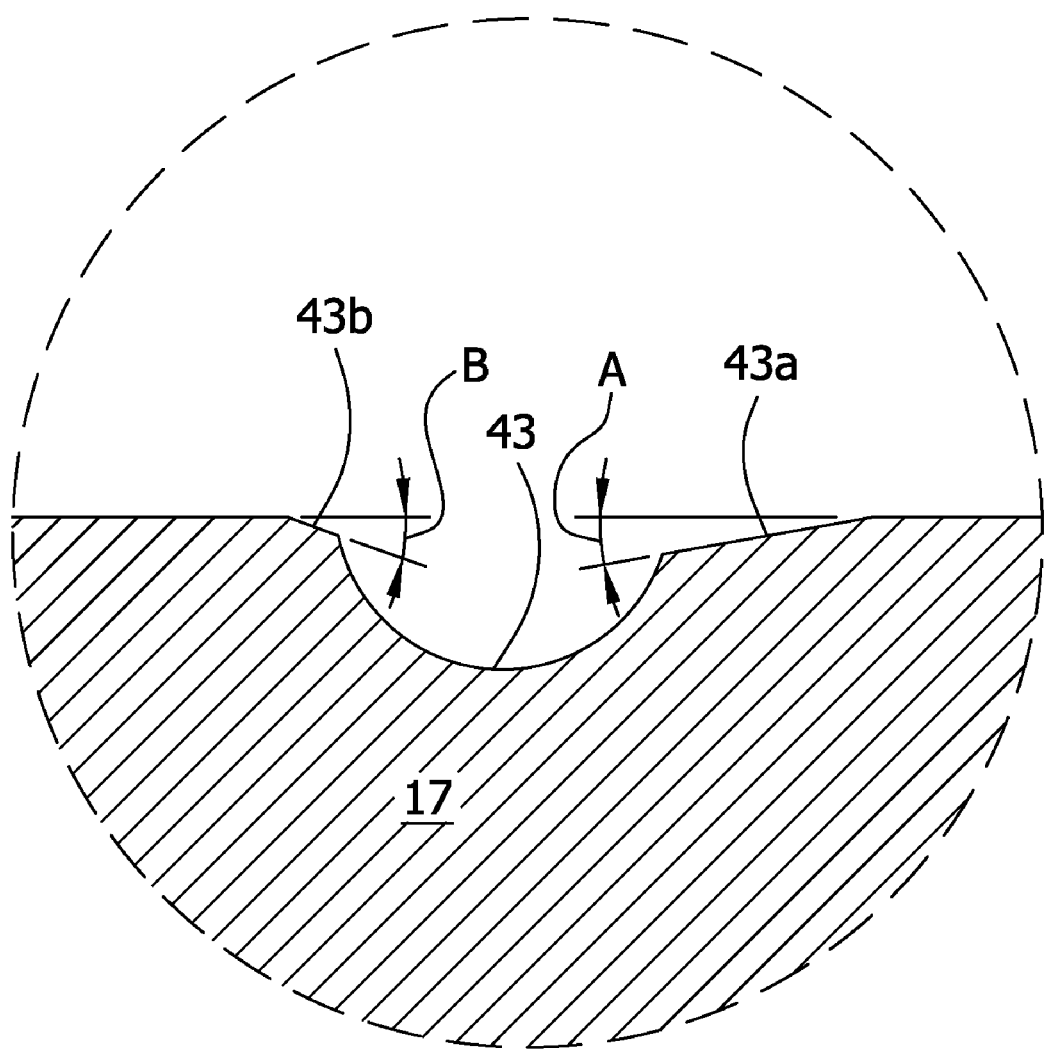
FIGS. 3A, 3B are further enlargements.

The groove 43 extends substantially continuously around the shaft 17 and has a constant shape. The groove has a radius in cross-section corresponding to that of the o-ring so that the o-ring is captured within the groove and is difficult to remove. In one embodiment, the depth of the groove is such that at least about 33% of the o-ring circumference is received in the groove, e.g., about 40% received. The groove 43 includes an inward edge 43a that is chamfered (FIG. 3A shows the groove with the o-ring omitted), in this embodiment chamfered at an angle A of about 10°. An outward edge 43b is chamfered at a larger angle B, e.g., about 20°. Note that the o-ring 41 is received at least about 33% in the groove exclusive of the depth of the chamfers. Alternatively, the edges may have a radius or other constructions that smooth the edges. The chamfers (or similar constructions) are advantageous, for among other reasons, they prevent damage as the various components are assembled onto the shaft. In particular, the outward chamfer prevents damage to the o-ring as it resists axial forces.

Further outward from the o-ring is a bearing cap 51 and hub ring 53. The outward end 45 of the shaft 17 is threaded to receive a dryer blower (not shown), though other elements or no elements may be attached at the outward end.

A thrust collar 57 and inward o-ring 59 are disposed inward from the bearing opposite the inward washer 35a. The thrust collar of this embodiment is annular and includes a void 61 extending inward from its inward face 63 for receiving the inward o-ring 59. The void 61 is sized and shaped such that the o-ring 59 extends outward from the inward face 63 of the thrust collar 57 for reasons described below. Also, the void 61 is sized and shaped so that upon compression of the o-ring 59, the o-ring can be completely, or substantially completely received in the void and thereby not extend outward from the inward face, as during the assembly embodiment described below. In this embodiment, the thrust collar is made of nylon and the o-ring is made of a resilient material such as rubber.

Referring to FIGS. 3-4 and 3B, 3C, inward from the thrust collar, the thrust system 25 also includes a tolerance system 71 for absorbing tolerance or variance in the thrust system. The tolerance system 71 includes a portion of a fan 67 (more broadly, an innermost component) for cooling the motor 11. The fan 67 is mounted on the rotor shaft 17 and is secured in place by the tolerance system 71. The tolerance system includes a deformable portion or recess 73 extending circumferentially in a hub 74 of the fan 67. This recess 73 is formed during assembly of the motor (i.e., it is not pre-formed in the hub), and its depth D may vary to absorb tolerances or variances in the system as described below in the exemplary assembly method. The hub also includes a chamfered edge 75 pre-formed in the hub, and formed to facilitate assembly. The tolerance system 71 further includes a protrusion 79 extending from the shaft 17. In this embodiment, the protrusion 79 is an outward edge of a rolled collar 80 that is integrally formed in the shaft 17. However, many other configurations are contemplated. The recess 73 in the hub is generally formed by the protrusion 79 during assembly, the protrusion thereafter being seated in the plastically deformed hub 74.

Figure 4:
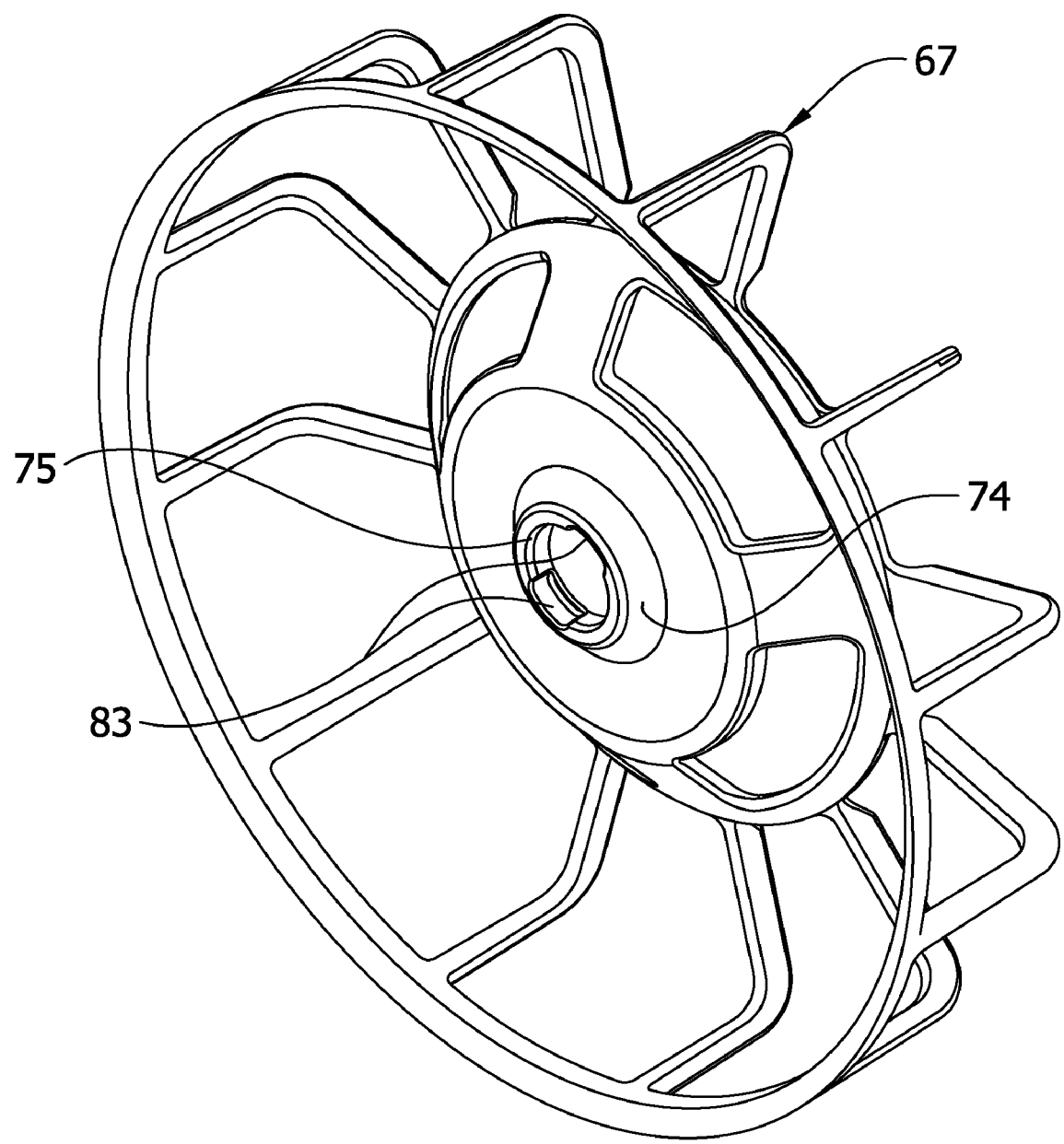
FIG. 4 is a perspective of a fan of the system.

Referring to FIG. 4, the fan hub 74 includes notches 83 (broadly, "relief") for facilitating assembly and inhibiting cracking of the hub. A solid, continuous hub might crack as it is secured over the rolled collar. Accordingly, and as shown, the hub 74 includes two of the notches 83, though other numbers of notches (e.g., 3-4) may be used. This design is superior to prior art designs wherein the hub had several ribs that functioned to retain the fan on a rolled collar or other protrusion from the shaft. However, the fan 67 is optional. The thrust collar 57 may instead include the portion of the tolerance system 71 that is presently described as being formed in the fan 67.

In one embodiment, the thrust system 25 is assembled on the shaft 17 by first sliding the hub 74 of the fan 67 over the shaft. Next, the thrust collar 57, inward o-ring 59, inward washer 35a and endshield assembly 19 (including the bearing 27) are placed on the shaft, followed by the outward washer 35b and the spacer 37. Axial inward pressure is applied on the spacer 37 to compress the inward o-ring 59 into the void 61 in the thrust collar 57.

Figure 3B:
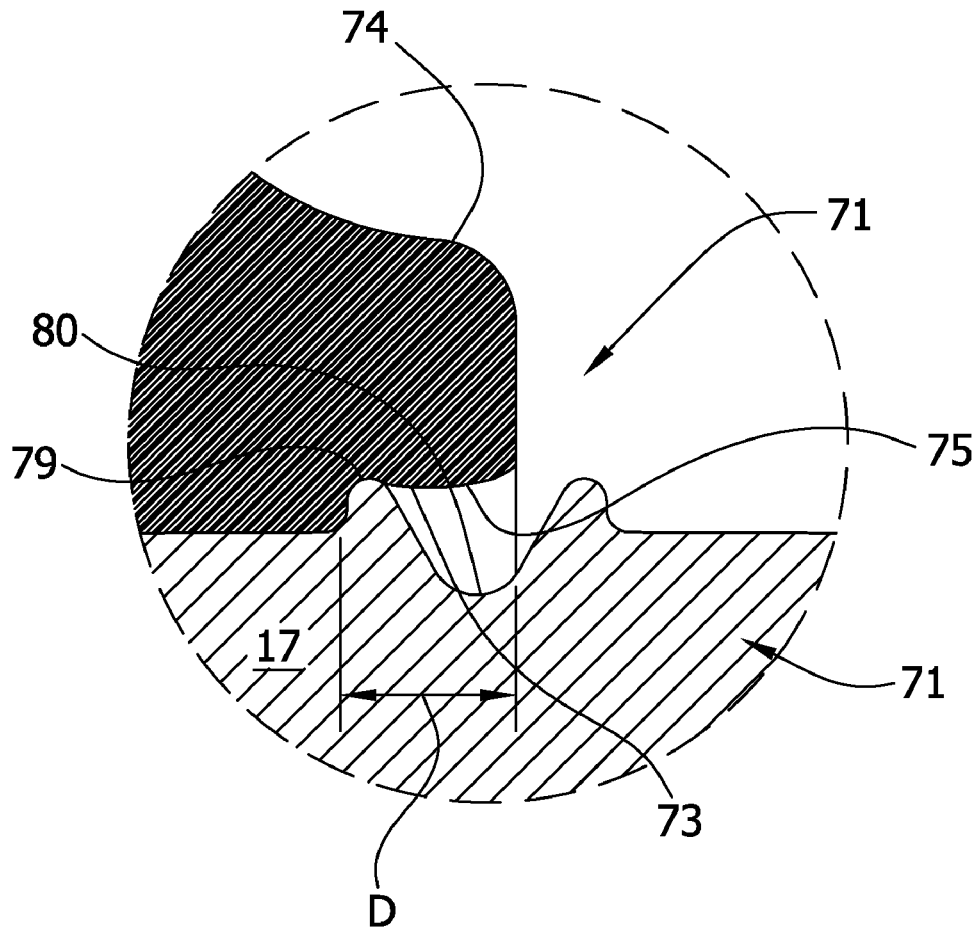
Figure 3C:
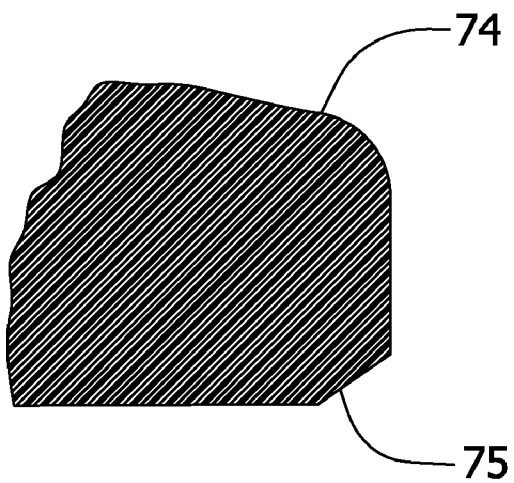
FIG. 3C shows the fan hub prior to assembly.

The pressure also forces the fan hub 74 into position on the protrusion 79 of the rolled collar 80 so that the recess 73 is formed. (Note: if the tolerance system is part of the thrust collar 57 instead of the fan 67 as shown, then the thrust collar is engaged with the rolled collar.) Pressure is released when the thrust system 25 is precisely positioned relative to the groove 43, and the recess then has depth D as shown in FIG. 3B. The depth D will vary depending on the location of the protrusion 79, the thickness of the fan 67, the thrust collar 57, the inward o-ring 59, the washers 35a and 35b, the endshield assembly 19 (including the bearing 27) and the spacer 37. In other words, the tolerance system 71 absorbs all the tolerance or variance in each of the aforementioned components of the motor 11 so that the thrust system 25 is precisely positioned in spite of the variance in each component.

After the pressure is released, the outward o-ring 41 is placed over the outward end of the shaft 17 (the o-ring may need to be stretched or expanded) and moved inward until it is seated in the groove 43. Upon placement of the outward o-ring 41, the thrust system 25 is disposed as shown in FIG. 3. The thrust system 25 of this embodiment allows a predetermined amount of free endplay in the shaft, e.g., less than about 0.020 inches or between about 0.002 and about 0.015 inches. The remainder of the parts to be mounted on the outward end of the shaft 17 (e.g., the dryer blower) can thereafter be mounted. Note that prior to assembly of the thrust system 25 on the shaft 17, the shaft is pressed into the rotor core 16 and a centrifugal actuator 87 (FIG. 2) is also pressed into the core on the opposite side of the core from the thrust system. In this embodiment, the thrust system 25 is disposed on the opposite side of the stator core 14 from the end of the shaft carrying the load (the grooved pulley 21 (FIG. 1) for the belt). Such placement reduces bearing temperature and generally improves the motor's reliability and service life.

Figure 5:
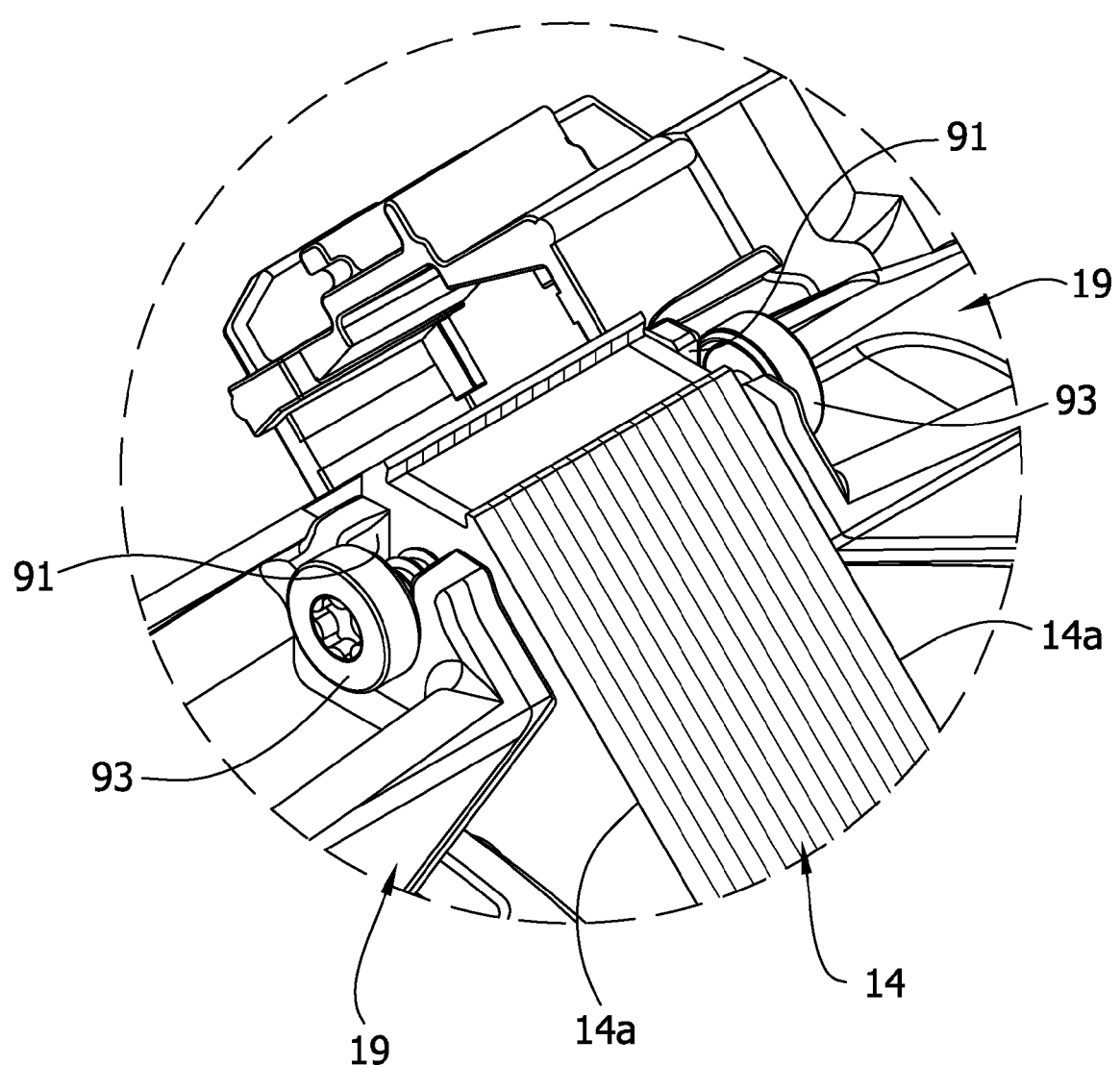
FIG. 5 is an enlarged view of a portion of FIG. 1 showing the area of fasteners connecting the endshield and the stator.

Referring to FIG. 5, each endshield 19 has open-ended slots 91 for receiving fasteners 93. In this embodiment, the fasteners are screws, and during assembly, the screws tend to pull the laminations 14a somewhat into the slots to assure a good connection. By using slots 91, rather than holes, the endshield 19 does not extend out from the stator core. In case of an impact force against the stator core 14, the endshield 19 is not impacted so as to inhibit damage to the endshield and damage to the motor. Prior art endshields simply have holes, meaning that the endshield will extend out from the stator core. If there is an impact force against the prior art endshield, it may change the airgap between the stator and rotor and thereby negatively impact operation of the motor.

Another advantage is that the endshield of this embodiment is an easier part to cast. This is because an enclosed hole, as used in prior art endshields, is harder to cast than the open-ended slot of this embodiment.

Embodiments of the invention enable a leaner manufacturing process than the prior art motor. For example, manufacturing of embodiments of the motor can be done without epoxy, thereby making the manufacturing process faster, more cost effective and more precise. The new motor also enables better control of shaft extension tolerances. Further, thrust loading on the bearing face is less than or equal to that of prior art motors so that the temperature in the bearings is maintained at an acceptable level. Note that free endplay enabled by the thrust system ensures that heat cannot be generated on both bearing faces. In other words, thrust loading only occurs against one of the bearing surfaces at any given time. The thrust assembly is cheaper than those employing ball bearings, and is more precise and easier to remove than those employing PAL nuts.

The thrust assembly of some embodiments also resists impact on either end of the shaft. The spacer described above transfers impact force to the endshield so that the bearing is not unseated. The o-ring in the groove also serves to maintain the assembly in place. The o-rings on both sides also function to keep motor noise low.

Another advantage of the o-ring in groove construction is that it reduces tolerance stack-up. The groove is dimensioned precisely from the end of the shaft, and the assembly is located off the groove and o-ring. All of the thrust on the shaft is reacted out through one thrust system, rather than two thrust systems like many prior art motors. Inward thrust is reacted out through the endshield due to the spacer, and outward thrust is also reacted through the endshield. In this way, the thrust system operates to inhibit damage to the bearing and motor under an impact load or force directed in either direction along or parallel to the axis of the shaft. Also, only the tolerance in the shaft groove, the o-ring and the assembly affect free endplay. Because there is no need to bear thrust on the other side of the rotor/stator, there is significantly less tolerance stack-up. This enables a more efficient manufacturing process and precise free endplay in the thrust system. In one embodiment, the tolerance is less than 0.020 inches or even between about 0.002 and 0.015 inches.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An electric motor comprising:
a stator,
a rotor including a rotor shaft having a locating groove formed therein and a protrusion spaced from the locating groove,
a thrust system mounted on the rotor shaft,
a locator disposed in the groove for locating the thrust system in a predetermined position, and
a tolerance system comprising a deformable portion of a component mounted on the shaft adjacent the protrusion and between the locator and the protrusion, the deformable portion being adapted to be deformed by the protrusion to absorb dimensional variation in the thrust system to facilitate the thrust system to be precisely located by the locator regardless of the dimensional variation.

2. The electric motor of claim 1 wherein the groove and locator are adapted to retain the thrust system under an applied load.

3. The electric motor of claim 1 wherein the locator includes an elastic ring.

4. The electric motor of claim 3 wherein the groove extends continuously around the shaft and has a substantially constant cross-sectional shape including a bottom portion having a substantially constant radius of curvature.

5. The electric motor of claim 4 wherein the cross-sectional shape of the ring includes a circumference and the groove is sized and shaped so at least 33% of said circumference is received in the groove.

6. The electric motor of claim 4 wherein edges of the groove are chamfered or rounded to facilitate assembly and inhibit damage to the ring.

7. The electric motor of claim 1 wherein the thrust system includes an endshield disposed at an end of the rotor and stator, the endshield including open-ended slots for receiving fasteners to secure the endshield to the stator.

8. The electric motor of claim 7 wherein the stator has an outer periphery and the endshield does not extend radially outward from the outer periphery of the stator.

9. The electric motor of claim 1 wherein the thrust system includes an endshield, a sleeve bearing retained in the endshield and a spacer disposed between the bearing and the locator.

10. The electric motor of claim 9 wherein the spacer is sized and positioned to contact the endshield upon upon application to the shaft of a force tending to move the spacer toward the endshield to transfer the force to the endshield.

11. The electric motor of claim 10 wherein the thrust system is adapted to accommodate thrust load directed in either axial direction along the rotor shaft.

12. The electric motor of claim 11 wherein the thrust system enables free play in the shaft such that thrust loading against the bearing can only occur against one face of the bearing.

13. The electric motor of claim 1 wherein said component mounted adjacent the protrusion comprises a fan.

14. The electric motor of claim 1 wherein the protrusion comprises a collar having an outward edge, there is a recess in the deformable portion extending inward from the outward edge of the collar, and the size of the recess varies depending on the amount of deformation of the deformable portion.

15. The electric motor of claim 1 wherein the component mounted adjacent the protrusion further includes a plurality of notches for facilitating engagement with the protrusion to inhibit damage to the component.

16. The electric motor of claim 1 wherein the component mounted adjacent the protrusion comprises a fan having a fan hub, the fan hub having a plurality of notches to inhibit cracking of the hub when it is engaged with the protrusion.

17. An electric motor comprising:
a stator,
a rotor including a rotor shaft having a locating groove formed therein,
a thrust system mounted on the rotor shaft, the thrust system including an endshield disposed at an end of the stator and rotor, the endshield including radially inward extending notches for receiving fasteners to secure the endshield to the stator, and
a locator disposed in the groove for locating the thrust system in a predetermined position.

18. The electric motor of claim 17 wherein the stator has an outer periphery and the endshield does not extend radially outward from the outer periphery of the stator.

19. An electric motor comprising:
a stator, a rotor including a rotor shaft having a locating groove formed therein, a thrust system mounted on the rotor shaft, the thrust system including an endshield disposed at an end of the stator and rotor and a sleeve bearing retained in the endshield, and a locator disposed in the groove for locating the thrust system in a predetermined position, the thrust system comprising a spacer between the bearing and locator, the spacer being sized and positioned to contact the endshield upon application to the shaft of a force tending to move the spacer toward the endshield to transfer the force to the endshield.

20. The electric motor of claim 19 wherein the thrust system is adapted to accommodate thrust load directed in either axial direction along the rotor shaft.

21. The electric motor of claim 20 wherein the thrust system enables free play in the shaft such that thrust loading against the bearing can only occur against one face of the bearing.

* * * * *